Figure 1:
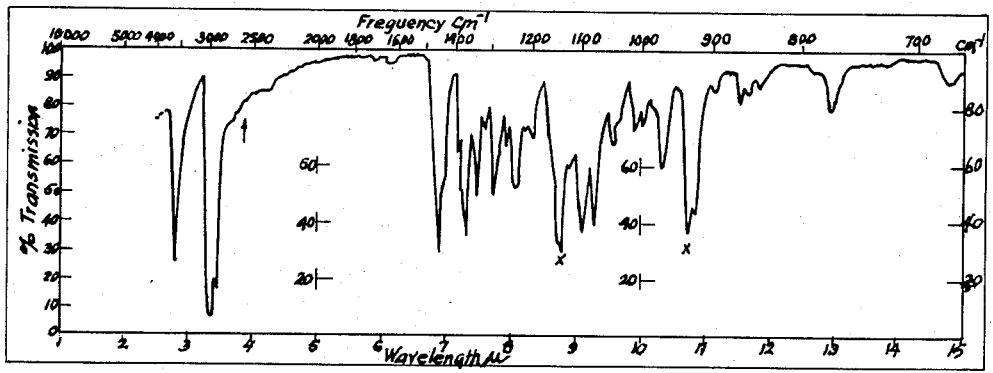
Figure 2:
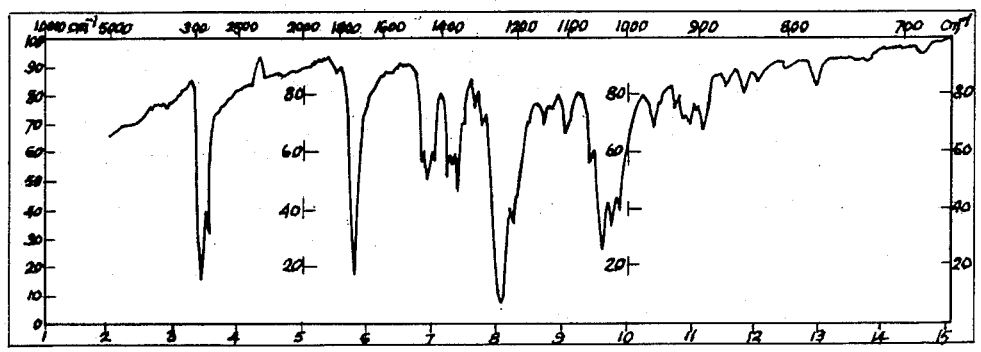
Figure 3:
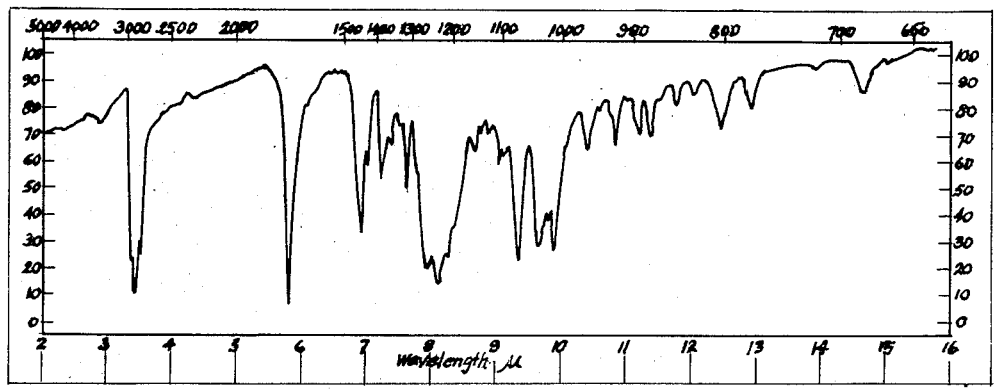
Figure 4:
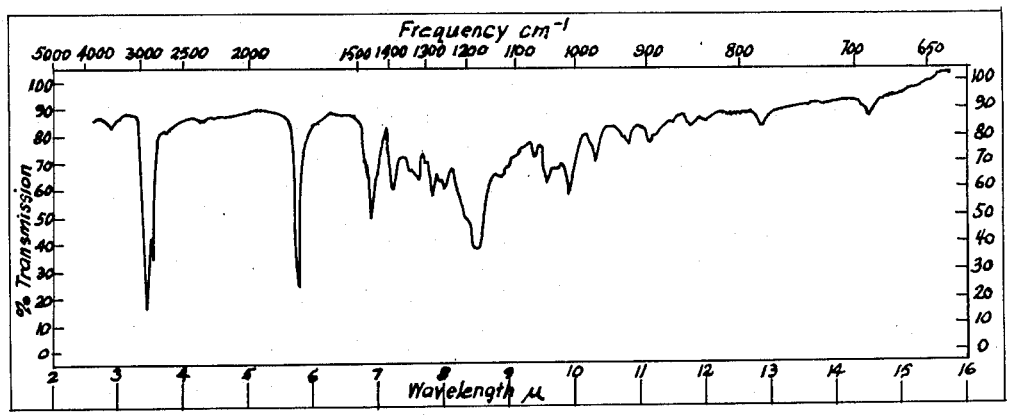
Figure 5:
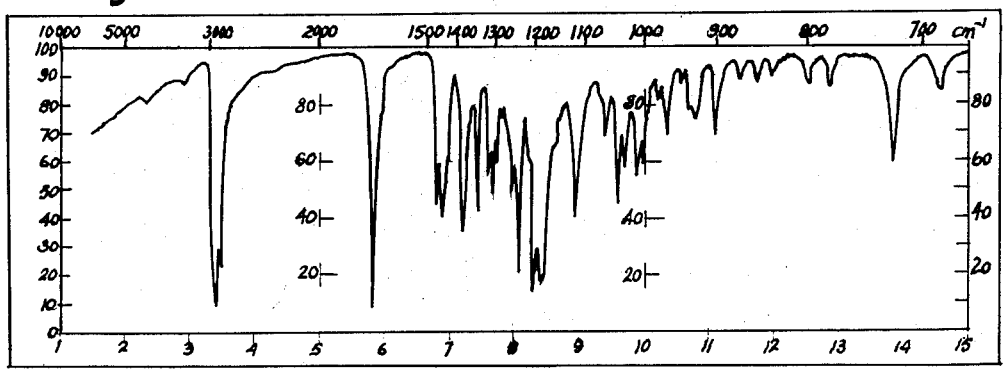
Figure 6:
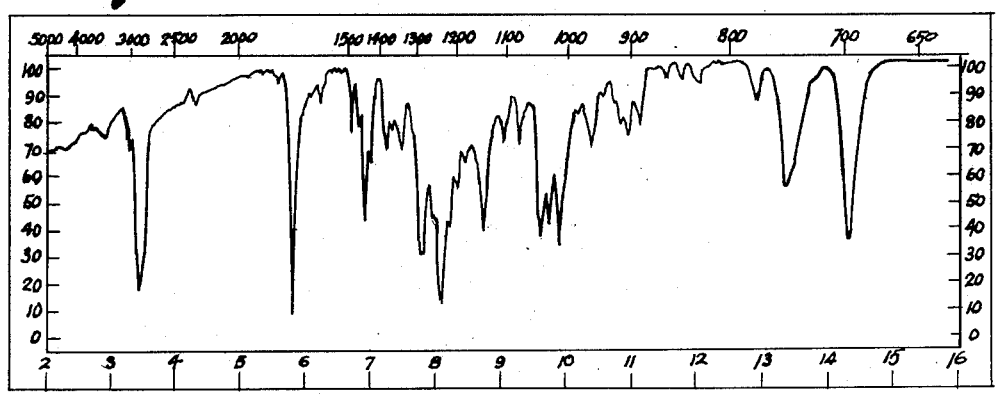
Figure 7:
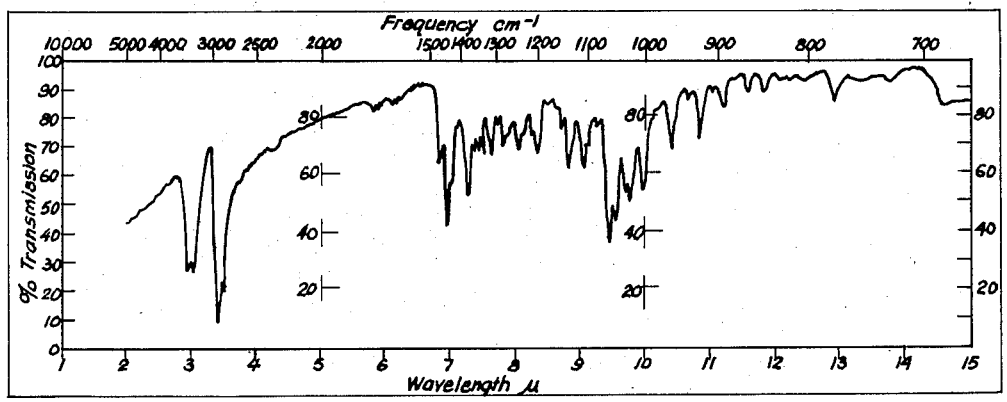
Figure 8:
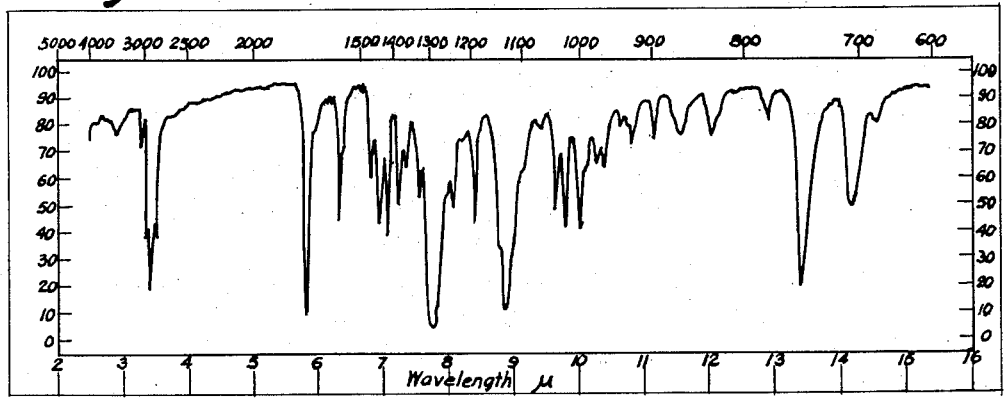

Jan. 5, 1965 KARL-HEINZ BORK ETAL 3,164,584
SULFUR-CONTAINING ANDROSTANE DERIVATIVES
Filed Dec. 24, 1963 3 Sheets-Sheet 1

INVENTORS
KARL-HEINZ BORK
KLAUS BRUCKNER
BY
ATTORNEYS

INVENTORS
KARL-HEINZ BORK
KLAUS BRUCKNER
BY Toulmin & Toulmin
ATTORNEYS

United States Patent Office 3,164,584
Patented Jan. 5, 1965

3,164,584
SULFUR-CONTAINING ANDROSTANE
DERIVATIVES
Karl-Heinz Bork, Griesheim, near Darmstadt, and Klaus
Bruckner, Darmstadt-Eberstadt, Germany, assignors to
E. Merck Aktiengesellschaft, Darmstadt, Germany
Filed Dec. 24, 1963, Ser. No. 333,046
Claims priority, application Germany, Dec. 24, 1962,
M 55,244
9 Claims. (Cl. 260—239.5)

It has been found that by the reaction of 1-androstene-17β-ol-3-ones or their 17-esters with an excess of hydrogen sulfide there were not obtained the expected 1-mercapto-1,2-dihydro derivatives, but that the reaction unexpectedly proceeded further. With the liberation of water another molecule of hydrogen sulfide combined with the steroid molecule to produce products which contained no free mercapto or thio-keto groups but instead disulfide bridges. It was also found that these new compounds have anabolic action.

A principal object of this invention, therefore, is to provide novel sulfur-containing androstane derivatives, and processes to produce same.

Another object is to provide pharmaceutical compositions based on the novel steroids of this invention.

A further object is to provide processes of effecting anabolic activities in mammals by administering the novel steroids of this invention.

Upon further study of the specification and claims other objects and advantages of the present invention will become apparent.

The novel steroids of this invention are produced by reacting hydrogen sulfide with a steroid of the formula

FORMULA I

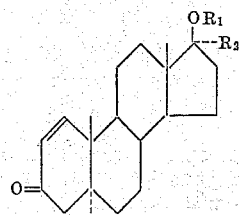

wherein $R_1$ is a hydrogen atom or an acyl group and
$R_2$ is a hydrogen atom or a saturated or unsaturated hydrocarbon of 1 to 3 carbon atoms The resultant compound differs from the original steroid by the presence of two added sulfur atoms and two more hydrogen atoms but with one less oxygen atom. At the 17-position there is a free or esterified hydroxyl group.

The process is preferably performed by heating the steroid with an excess of hydrogen sulfide and in the presence of an inert solvent in a tubular bomb or autoclave, preferably to a temperature between 60 and 150° C., inclusive. The molar ratio of hydrogen sulfide to the initial steroid is at least 2:1; preferably in the range of 100:1; to 5:1. Under these conditions the reaction is usually completed after 10 to 100 hours. As solvents, tetrahydrofuran and dioxane are preferred, although hydrocarbons like benzene, toluene, or xylene, petroleum fractions, alcohols such as methanol, ethanol or propanol, or ketones such as acetone can also be used.

The reaction can also be performed without the application of pressure and/or at normal temperature, but will then proceed much more slowly. The hydrogen sulfide is preferably first condensed at a low temperature in the reaction vessel, and possibly in the presence of a solvent. The steroid is then added, and the vessel is then closed and heated as described. To accelerate the reaction, it may be advisable to add catalysts. Basic catalysts, e.g. amines such as piperidine, triethylamine or pyridine are preferable. Instead of hydrogen sulfide, use can also be made of precursors of $H_2S$, i.e. substances which produce hydrogen sulfide under the conditions of the reaction.

The reaction mixture is worked up in the usual manner, if necessary with the help of chromatographic purification. During the reaction, by-products are generally formed, of which the identities and amounts are generally determined by the conditions of the reaction.

In the starting material of Formula I, the acyl groups are preferably those residues which can be derived from a hydrocarbon mono- or di-carboxylic acid with 1 to 18 carbon atoms, being saturated or unsaturated, of straight or branched chain, aromatic or cycloaliphatic and combinations thereof. Such acids are e.g. formic, acetic, propionic, butyric, valeric, isovaleric, trimethylacetic, caproic, enanthic, caprylic, capric, palmitic, stearic, undecylenic, oleic, benzoic, hexahydrobenzoic, cyclopentyl-acetic and -propionic, cyclohexyl-acetic and -propionic, phenyl-acetic and -propionic, succinic, maleic, and nicotinic acid. Advantageously, the 17-esters are physiologically compatible.

Examples of starting substances include—1-androstene-17β-ol-3-one, and also 17α-methyl-, 17α-ethyl-, 17α-n-propyl-, 17α-isopropyl-, 17α-allyl-, 17α-ethynyl-; and 17α-propargyl-1-androstene-17β-ol-3-one, as well as the 17-esters of these substances, especially their acetates, propionates, butyrates, valerates, caproates, and their cyclohexyl- and phenyl-propionates.

The chemical structures of the compounds produced by this invention, by analyses, spectra and molecular weight determinations are in agreement with the formula

FORMULA II

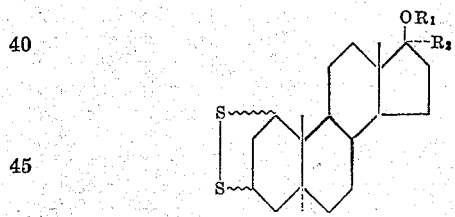

wherein $R_1$ and $R_2$ have the meanings already given

The wavy lines mean that the spatial positions of the disulfide bridge may be α or β.

The disulfide bridge of the new androstane derivatives was, for example, determined by splitting it with zinc in acetic acid according to standard procedures whereby the corresponding dimercapto compound is formed.

In the case that the foregoing procedure is applied to the reaction product obtained from 1-androstene-17β-ol-3-one and hydrogen sulfide (cf., for example, Example 4), a compound is obtained which probably is 1,3-dimercapto-androstane-17β-ol. M.P. 152–154° C., $(\alpha)_D + 112°$ (dioxane). In the IR spectrum, it shows characteristic SH-bands at 3.95μ.

The analysis for $C_{19}H_{32}OS_2$ gave the following data:

| | C | H | S |
|---|---|---|---|
| Calculated | 67.0 | 9.5 | 18.8 |
| Found | 66.8 | 9.5 | 17.8 |

The presence of two mercapto groups in the molecule may be confirmed by acetylating them to form the corresponding di-acetylthio derivatives. The acetylation may be effected according to well known procedures, for example by reaction with acetic anhydride in pyrdine.

In the above mentioned example, a di-acetylthio compound is obtained which probably is 1,3-diacetylthio-androstane-17β-ol-17-acetate. It is characterized by the following data: M.P. 150–151° C.; $(\alpha)_D + 128°$ (dioxane), $\lambda_{max}$ 235.5 mµ, $$E_{1\ cm.}^{1\%} 244$$

In the N.M.R. spectrum, signals of two acetylthio groups appear at 2.27 and 2.31 p.p.m.

Analysis for $C_{25}H_{38}O_4S_2$:

|  | C | H | S |
|---|---|---|---|
| Calculated | 64.5 | 8.2 | 13.7 |
| Found | 64.7 | 8.5 | 13.3 |

All compounds of this invention react in a similar way. This means that the group which is supposed to be a di-sulfide bridge in the 1,3-position may be converted into two mercapto groups in all compounds according to this invention.

These products of this invention which have a free hydroxyl group in the 17-position can, if desirable, be subsequently esterified.

For the production of such esters, use can be made of any acids or functional derivatives thereof which will produce physiologically compatible esters, e.g. saturated or unsaturated, branched or straight chain monocarboxylic acids such as acetic, propionic, butyric, valeric, iso-valeric, trimethylacetic, caproic, enanthic, caprylic, palmitic, undecylenic; aromatic such as benzoic; cycloaliphatic such as hexahydrobenzoic, cyclopentyl-, cyclohexyl-, or possibly also substituted aryl-acetic and -propionic acid, as well as phenyl-acetic and phenyl-propionic acid, and also halogenated carboxylic acids such as chlorinated acetic acid, ether-acids or heterocyclic acids such as furane-carboxylic-2 or nicotinic acid. For the production of water-soluble derivatives, esters of dicarboxylic acids, amino- or alkylamino-acids, or phosphoric or sulfuric acids can be prepared. In this manner it is possible to produce, e.g. the oxalate, succinate, maleate, or the acid-addition salts of aminocarboxylic acid esters as, e.g. the aspartic-, aminoacetic- or diethylaminoacetic-acid ester. Besides the free acids, suitable derivatives thereof such as their halides, anhydrides, thio-derivatives and ketenes can be used for preparing the esters. For ester interchange procedures, the lower alkyl esters are also suitable. Preferably the ester contains not more than 18 carbon atoms in the acyl portion.

It is also possible, on occasions, to saponify the 17-acyloxy compounds. Such a saponification can be effected by conventional methods in acid or alkaline media, as by treatment with dilute hydrochloric or sulfuric acid, or with dilute sodium or potassium hydroxide under cold or heated conditions. Saponification is preferably accomplished in the presence of a suitable inert organic solvent such as methanol, ethanol or dioxane. On occasions it may also be advantageous to use suitable ion exchangers for saponification.

The 17α-moiety, which is identified as $R_2$ in the structural formulae, can be either hydrogen or hydrocarbon of 1–3 carbon atoms, saturated or unsaturated, for example, ethynyl, methyl, ethyl, n-propyl, isopropyl, vinyl, propenyl, allyl, and propargyl.

These new compounds can be used in admixture with pharmaceutical carriers and excipients. As carrier substances, use can be made of those suitable for parenteral, enteral or topical application and which, of course, do not enter into reaction with the new compounds, as for example, water, vegetable oils, polyethylene glycol, gelatine, lactose, starch, magnesium stearate, talcum, vaseline, cholesterol, etc. For parenteral application, it is especially advantageous to use solutions, preferably oily or aqueous solutions, as well as suspensions, emulsions or implants. For enteral application, tablets or dragees can be used, while for topical application salves or cremes are suitable, and can be sterilized or mixed with ancillary substances such as preservatives, stabilizers or wetting agents, or salts for changing the osmotic pressure, or buffer substances.

The pharmaceutical compositions of this invention are preferably used in unit dosage forms containing from 5–200 mg. of the active novel sulfur-containing steroids.

The anabolic and the androgenic activity of the novel steroids of this invention was tested according to the method described by Hershberger, Shipley and Meyer in Proceedings of the Society for Experimental Biology and Medicine, vol. 83, pages 175–180 (1953).

The anabolic activity is determined by measuring the increase in weight of the musculus levator ani in rats whereas the androgenic activity results from determining the increase in weight of the seminal vesicle in rats.

The tests were conducted with male castrated rats. The novel compounds were administered on 7 subsequent days orally and subcutaneously.

The test results are evaluated according to the method described by Bliss in P. György, Vitamin Methods, vol. II, 1959, p. 448.

From the obtained results, the ratio of anabolic to androgenic activity is also determined.

The 1-androstene-17β-ol-3-one which is used as the starting material, and the corresponding 17α-methyl- and 17α-ethyl derivatives are described in the Journal of Organic Chemistry, vol. 27, page 248 (1962). The remaining derivatives of Formula I can be produced from 1-androstene-17β-ol-3-one by reacting the latter with ethylene glycol in benzene and p-toluene sulfonic acid to ketalize it in the 3-position, and then oxidizing the ketal thus produced, e.g. with chromic acid in pyridine or by the method of Oppenauer. A 17-ketone prepared in this manner can be converted in the usual manner by the corresponding Grignard or lithium alkyl compounds into the 17β-hydroxy compounds substituted in the 17α-position. The ketal group in the 3-position can be split off by gentle acid hydrolysis.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

In a glass tubular bomb about 5 g. hydrogen sulfide are condensed in 20 ml. tetrahydrofuran at −60° C. After an addition of 0.5 ml. piperidine and 1 g. 17α-methyl-1-androstene-17β-ol-3-one, the tube is sealed by fusion and heated 20 hours to 110° C. After cooling, the reaction mixture is diluted with water and extracted with ether. The ether is then evaporated and the remaining oil is dissolved in benzene and chromatographed on 20 g. silica gel. After evaporating down the benzene eluate, the residue weighs 0.5 g., and after recrystallization from acetone melts at 210–212° C.

$\lambda_{max}$ 371 mµ, $\epsilon = 105$ (ethanol)

Molecular weight: Calculated, 352.6; Determined, 359 (Rast).

Elementary analysis:

|  | C | H | S |
|---|---|---|---|
| Calculated | 68.13 | 9.15 | 18.18 |
| Determined | 67.9 | 9.1 | 17.1 |

The new compound is believed to have the formula $C_{20}H_{32}OS_2$ and to be 1,3-epidithio-17α-methyl-androstane-17β-ol.

The infrared spectrum of this compound is shown in FIG. I of the accompanying drawings.

*Example 2*

(a) In a solution of 2 g. 1-androstene-17β-ol-3-one acetate in 40 ml. tetrahydrofuran and 1 ml. piperidine, about 10 ml. hydrogen sulfide are condensed at −60° C. The mixture is then kept 20 hours at 120° C. with continual shaking, and is then cooled and diluted with ether. It is washed with water, dried over sodium sulfate, and evaporated down. The crystalline substance thus obtained, which is believed to be 1,3-epidithio-androstane-17β-ol-acetate, and which melts at 154–160° C., is recrystallized from methanol. M.P. 170–171° C.; $(\alpha)_D+103°$ (dioxane).

Elementary analysis for $C_{21}H_{32}O_2S_2$:

|  | C | H | S |
|---|---|---|---|
| Calculated | 66.27 | 8.47 | 16.85 |
| Determined | 66.8 | 8.5 | 16.4 |

UV: 371 mμ, ε=102.

The infrared spectrum of this compound is shown in FIG. II of the accompanying drawings.

(b) 9.0 g. of the product thus obtained are saponified after admixture with 100 ml. dioxane and 360 ml. of a 1% solution of KOH in methanol by heating 1 hour under reflux. The solution is then cooled and poured into 2.5 liters of water. The resulting suspension is extracted five times with ether, the extracts washed with water, dried over sodium sulfate, and evaporated down. The residue is recrystallized from methanol. The substance is believed to be 1,3-epidithio-androstane-17β-ol. It melts at 218–219° C.; $(\alpha)_D+108°$ (dioxane).

Elementary analysis for $C_{19}H_{30}OS_2$:

|  | C | H | S |
|---|---|---|---|
| Calculated | 67.40 | 8.93 | 18.94 |
| Determined | 67.0 | 8.9 | 18.6 |

(c) 0.5 g. of the product of Example 2 (a) in admixture with 25 ml. methanol and 3 ml. of a 25% HCl solution are stirred 24 hours at room temperature. The mixture is then diluted with water and worked up as in Example 2(b). M.P. 218–219° C.

(d) 3.5 g. of the alcohol obtained in Example 2(b) or 2(c) in admixture with 35 ml. pyridine and 35 ml. propionic acid anhydride are heated one hour on a steam bath. The reaction mixture is then poured into water and the crude ester filtered with suction. After recrystallization from hexane it melts at 143–144° C.; $(\alpha)_D+105°$ (dioxane). It is believed to be 1,3-epidithio-androstane-17β-ol-propionate.

Elementary analysis for $C_{22}H_{34}O_2S_2$:

|  | C | H | S |
|---|---|---|---|
| Calculated | 66.94 | 8.68 | 16.25 |
| Determined | 67.4 | 8.9 | 15.8 |

Infrared spectrum: FIG. III of the accompanying drawings.

(e) By analogy to Example 2(d), 5.1 g. of the free alcohol in admixture with 50 ml. pyridine and 50 ml. cyclohexylpropionic acid anhydride are reacted to produce the corresponding 17-cyclo-hexylpropionate. M.P. 93–95° C. (methanol); $(\alpha)_D+97°$ (dioxane). It is believed to be 1,3-epidithio-androstane-17β-ol-cyclohexyl-propionate.

Elementary analysis for $C_{28}H_{44}O_2S_2$:

|  | C | H | S |
|---|---|---|---|
| Calculated | 70.54 | 9.38 | 13.45 |
| Determined | 70.5 | 9.6 | 13.4 |

Infrared spectrum: FIG. IV of the accompanying drawings.

(f) 5.1 g. of the free alcohol obtained in Example 2(b) in admixture with 50 ml. pyridine and 50 ml. enanthic acid anhydride are allowed to stand 18 hours at room temperature. The reaction mixture is poured into a 2% sodium bicarbonate solution, stirred two hours, and then extracted with ether. The dried ether extract is evaporated down and the residue recrystallized from methanol. M.P. 70–71° C.; $(\alpha)_D+93°$ (dioxane). It is believed to be 1,3-epidithio-androstane-17β-ol-enanthate.

Elementary analysis for $C_{26}H_{42}O_2S_2$:

|  | C | H | S |
|---|---|---|---|
| Calculated | 68.97 | 9.80 | 14.16 |
| Determined | 69.2 | 9.8 | 14.2 |

Infrared spectrum: FIG. V of the accompanying drawings.

(g) 5.9 g. of the free alcohol obtained in Example 2(b) in admixture with 60 ml. pyridine and 60 ml. phenyl propionic acid anhydride are esterified by analogy to Example 2(f). M.P. 121–122° (hexane); $(\alpha)_D+105°$ (dioxane). It is believed to be 1,3-epidithio-androstane-17β-ol-phenylpropionate.

Elementary analysis for $C_{28}H_{38}O_2S_2$:

|  | C | H | S |
|---|---|---|---|
| Calculated | 71.44 | 8.14 | 13.62 |
| Determined | 71.4 | 8.4 | 13.5 |

Infrared spectrum: FIG. VI of the accompanying drawings.

*Example 3*

2.3 g. 1-androstene-17β-ol-3-one-phenyl-propionate, 30 ml. dioxane, 0.3 ml. pyridine and 30 g. hydrogen sulfide were allowed to stand in a bomb tube 15 days at room temperature. The product was then worked up as in Example 1 and chromatographed on a column of 50 g. silica gel. From the benzene-ether (5:2) eluate, crystals were obtained with M.P. 115–119° C., and after recrystallization had a M.P. of 120–122°; $(\alpha)_D+103°$ (dioxane). According to its IR spectrum the substance is identical with the product of Example 2(g), and is therefore believed to be 1,3-epidithio-androstane-17β-ol-phenyl-propionate.

*Example 4*

In a bomb tube 1 g. 1-androstene-17β-ol-3-one, 0.2 ml. piperidine, 20 ml. tetrahydrofuran and 2 g. hydrogen sulfide are heated 25 hours at 80° C. After the crude product is worked up as in Example 1, it is filtered over 10 g. silica gel. After being evaporated down, the residue obtained from the eluate is recrystallized from methanol. M.P. 218° C.; $(\alpha)_D+108°$ (dioxane). The substance is identical with the product obtained in Example 2(b), so that its structure is believed to be 1,3-epidithio-androstane-17β-ol. The infrared spectrum of this compound is shown in FIG. VII of the accompanying drawings.

*Example 5*

A reaction mixture as prepared in Example 4 is allowed to stand 15 days at 30° C. After being worked up and chromatographed, crystals melting at 218–219° C. are obtained.

Example 6

In a procedure similar to that of Example 4, the piperidine is substituted by a corresponding amount of triethylamine, and the tetrafuran by dioxane. After being worked up and chromatographed in the usual manner, the product after recrystallization from methanol has a M.P. of 217–219° C.; $(\alpha)_D + 105°$ (dioxane).

Example 7

By analogy to Example 2, 3.4 g. 17α-ethynyl-1-androstene-17β-ol-3-one, 0.5 ml. piperidine, 30 ml. dioxane and 10 g. hydrogen sulfide are heated 20 hours at 110° C. After being worked up in the usual manner, the product is chromatographed over a column of 70 g. silica gel. From the ether-acetone (1:1) eluates a crystalline substance is obtained which is believed to be 1,3-epidithio-17α-ethynyl-androstane-17β-ol.

Example 8

By analogy to Example 2, 1.8 g. 17α-propargyl-1-androstene-17β-ol-3-one are reacted with hydrogen sulfide whereby a substance is obtained which is believed to be 1,3-epidithio-17α-propargyl-androstane-17β-ol.

When using 17α-allyl-1-androstene-17β-ol-3-one as starting material, the corresponding 17α-allyl compound is obtained.

Example 9

By analogy to Example 2, 2.3 g. of 17α-n-propyl-1-androstene-17β-ol-3-one are reacted with hydrogen sulfide whereby a sulfur containing androstane is obtained which is believed to be 1,3-epidithio-17α-n-propyl-androstane-17β-ol.

Example 10

(a) 1-androstene-17β-ol-3-one-acetate is reacted with hydrogene sulfide according to the method described in Example 2(a) and then hydrolyzed according to the method described in Example 2(b).

(b) 3 g. of the thus obtained free alcohol are heated for 1 hour on a steam bath with a mixture of 30 ml. of pyridine and 7.95 g. of nicotinic acid chloride hydrochloride. Upon cooling, the reaction mixture is diluted with 1000 ml. of ice water. The separated crystals are filtered off, washed with water, dried and recrystallized from acetone. M.P. 194–195° C.; $(\alpha)_D + 146°$ (dioxane).

Elementary analysis for $C_{25}H_{33}O_2NS_2$ (probably 1,3-epidithio-androstane-17β-ol-nicotinate)

|  | C | H | O | N | S |
|---|---|---|---|---|---|
| Calculated | 67.7 | 7.5 | 7.2 | 3.1 | 14.5 |
| Found | 67.8 | 7.8 | 7.7 | 3.2 | 13.9 |

The infrared spectrum of this compound is shown in FIG. VIII of the accompanying drawings.

Pharmacetuical Preparations

(I) TABLETS

One tablet contains: Mg.
- The androstane of formula $C_{20}H_{32}OS_2$ as obtained, for instance, by the process of Example 1 _____ 5
- Lactose _____ 100
- Corn starch _____ 15
- Talc _____ 10
- Magnesium stearate _____ 2

(II) TABLETS

One tablet contains: Mg.
- The androstane of formula $C_{20}H_{32}OS_2$ as obtained, for instance, by the process of Example 1 _____ 3
- Lactose _____ 80
- Potato starch _____ 20
- Talc _____ 12

(III) TABLETS

One tablet contains: Mg.
- The androstane of formula $C_{20}H_{32}OS_2$ as obtained, for instance, by the process of Example 1 _____ 1
- Lactose _____ 60
- Potato starch _____ 20
- Talc _____ 10

(IV) INJECTION SOLUTIONS 20 g. of the acetate of the propionate of the androstane of formula $C_{19}H_{30}OS_2$ as obtained, for instance, by the process of Examples 2(a) and 2(d), respectively, are dissolved in 1000 cc. of peanut oil. Ampoules are filled with 1 ml. of this solution each and are sterilized according to standard procedures.

(V) INJECTION SOLUTIONS

Each ampoule contains 100 mg. of any of the compounds as prepared according to the processes described in Examples 2(e), 2(f), 2(g), and 10, respectively, in 1 cc. of peanut oil. Preferably the ampoules are filled under nitrogen.

(VI) OINTMENT

The androstane of formula $C_{20}H_{32}OS_2$ having a melting point of about 210 to 212° C. is incorporated into an ointment base consisting of paraffine oil with 40% water and usual emulgators. The active ingredient is present in an amount of 1%.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably, and intended to be, within the full range of equivalence of the following claims.

What is claimed is:

1. A compound of the formula

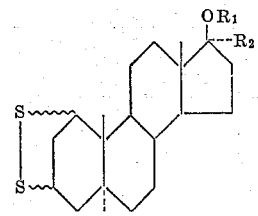

wherein
$R_1$ is selected from the group consisting of hydrogen and an acyl group, said acyl group being derived from a hydrocarbon carboxylic acid of 1–18 carbon atoms, said acid being selected from the group consisting of monocarboxylic and dicarboxylic acids; and
$R_2$ represents a member of the group consisting of hydrogen and hydrocarbon of 1–3 carbon atoms.

2. 1,3-epidithio-androstane-17β-ol.
3. 1,3-epidithio-androstane-17β-ol-acetate.
4. 1,3-epidithio-androstane-17β-ol-propionate.
5. 1,3-epidithio-androstane-17β - ol - cyclohexyl - propionate.
6. 1,3-epidithio-androstane-17β-ol-enanthate.
7. 1,3-epidithio-androstane-17β-ol-phenyl-propionate.
8. 1,3-epidithio-17α-methyl-androstane-17β-ol.
9. 1,3-epidithio-androstane-17β-ol-nicotinate.

References Cited by the Examiner

UNITED STATES PATENTS 2,260,953  10/41  Rebold _____ 260—125

LEWIS GOTTS, *Primary Examiner.*